United States Patent [19]
Bruno

[11] 4,157,673
[45] Jun. 12, 1979

[54] MOTOR SAW BLADE
[76] Inventor: Mario Bruno, via Pettinengo 12, 10149 Turin, Italy
[21] Appl. No.: 857,092
[22] Filed: Dec. 5, 1977
[30] Foreign Application Priority Data
Jan. 14, 1977 [IT] Italy .................. 67081 A/77
[51] Int. Cl.² .................. B23D 45/02; B23D 57/00; B27B 33/02
[52] U.S. Cl. .......................... 83/837; 83/855
[58] Field of Search ............. 83/835, 837, 838, 846, 83/855, 848

[56] References Cited
U.S. PATENT DOCUMENTS
4,011,783  3/1977  Mobley .................. 83/846
4,012,820  3/1977  Nowak .................. 83/835 X FOREIGN PATENT DOCUMENTS
459238   8/1949  Canada .................. 83/846
2319875 12/1974  Fed. Rep. of Germany ... 83/846
1034528  4/1953  France .................. 83/835
977837  12/1964  United Kingdom ......... 83/835
1018976  2/1966  United Kingdom ......... 83/838

Primary Examiner—Willie G. Abercrombie
Attorney, Agent, or Firm—Miller & Prestia

[57] ABSTRACT

A motor saw blade with unset saw teeth along at least one edge of the blade and comprising finishing saw teeth having ground centripetally tapering flanks and alternating with roughing saw teeth thinner and longer than the finishing saw teeth so that neither of the teeth need be set.

17 Claims, 15 Drawing Figures

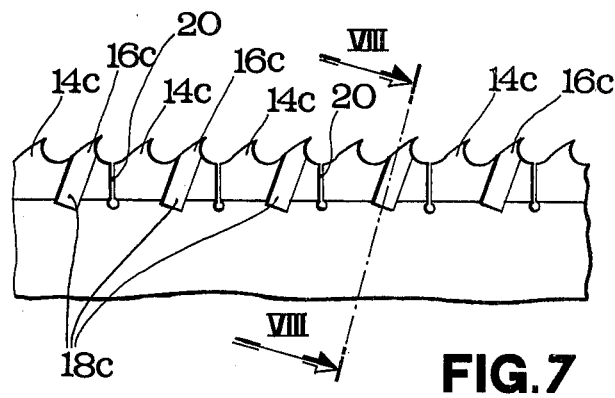
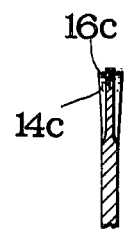
FIG.7  FIG.8
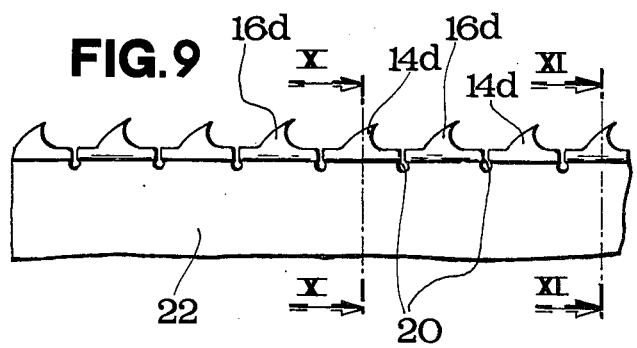
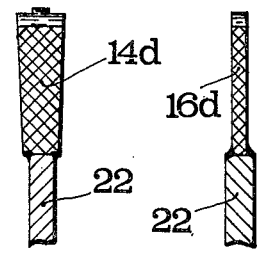
FIG.9  FIG.10  FIG.11
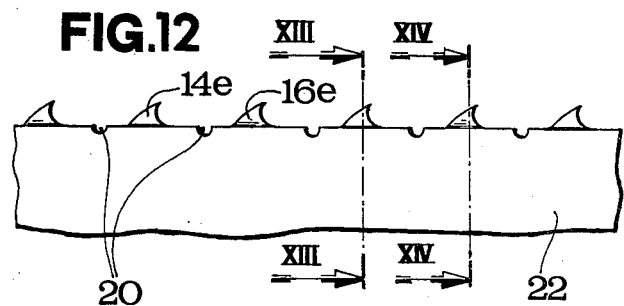
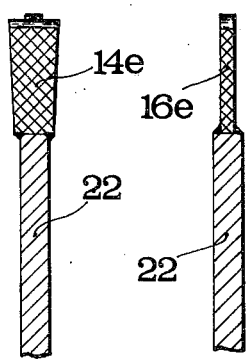
FIG.12  FIG.13  FIG.14
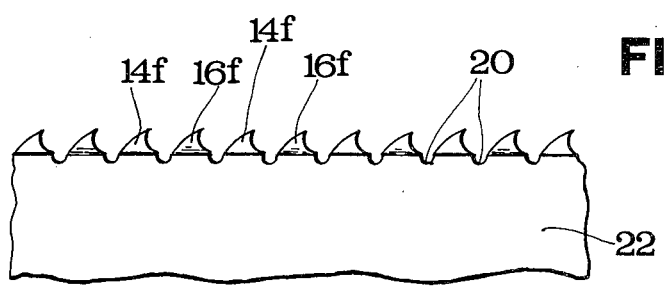
FIG.15

MOTOR SAW BLADE

This invention relates to a motor saw blade, particularly for cutting metals, having unset teeth, for circular, reciprocating or band saws. Although this saw blade is designed particularly for cutting metals, it may also be used for cutting other materials such as wood or plastic materials.

It is known to use metal cutting saw blades, for example, circular saw blades, in which the teeth are not set and a flat disk is used instead, in which the saw tooth flank region is ground in a slightly tapering fashion to widen the cut relative to the thickness of the saw blade, which previously was achieved by the setting of the saw teeth. A saw blade of this type for a reciprocating saw is disclosed by Italian Pat. No. 954,779 of the same Applicant. In this saw blade the teeth are alternately chamfered on both opposite sides to provide a chip breaking action which otherwise could not be obtained if the teeth are not set.

Such unset saw blades of the prior art however have the drawback that it is rather expensive to regrind them because not only the apices of the saw teeth have to be ground, but also the chamfer on the saw tooth flanks has to be reestablished. Regrinding a disk saw blade having a diameter of 40" today costs about 18 dollars and the chamfering operation alone costs about 6 dollars, which means a 30% increase over the cost for grinding the saw tooth apices alone. Considering that each saw blade is reground 25 to 30 times on an average, it is evident that the additional cost for reestablishing the chamfer is not to be neglected.

Considering now particularly band saws, which are typical metal cutting saws, it is to be noted that all the band saws at present in use are of the type having set teeth and the efficiency of these saws is unsatisfactory for many materials, particularly soft materials such as mild steel and aluminum. In fact, the band saws with set teeth at present in use normally have no, or virtually no, cutting angle. Consequently the saw teeth "gnaw" the material instead of removing chips therefrom. This is because the chips, if they were produced, would be hard to disintegrate as a saw having set teeth does not break the chips adequately. In fact, the chip breaking action obtained by setting the saw teeth is quite insufficient and decreases with increased wear of the saw. This is why producers hitherto had to keep the cutting angle practically at zero with the result that the removed material is reduced to minute fragments of the powder type and it is evident that the energy spent in vain for reducing to powder the entire amount of the removed material will heavily reduce6the efficiency of the saw with respect to what it could be if the saw could really produce chips and thus waste much less energy for removing the material.

On the other hand, if a saw were to be made with set teeth having the best possible cutting angle for the material in question (for example, 20 degrees or more for mild steel and the like), the produced chips would not be broken and would therefore be hard to disintegrate and thus would impair the quality of operation of the tool. Further, the chip breaking action obtained by setting the saw teeth, if it is unsatisfactory with a new tool, practically is reduced to zero after the tool has been reground several times and consequently the degree of setting of the saw teeth has been reduced.

It is also to be noted that setting of the teeth, particularly in band saws, often causes considerable drawbacks impairing the operation of the saw over the best theoretically obtainable operating conditions which, as pointed out above, are always unsatisfactory. In fact, setting of the teeth is always made at a considerable angle which is much greater than it would have to be to avoid seizure between the saw blade and the walls of the cut being made by the saw blade in the cut material. In practice this angle is usually as great as 40 or 50 times the angle of the taper used in circular saw blades having unset teeth. So the tool is not very well guided and unstable and tends to deviate or bend from its correct neutral position due to small inaccuracies of the saw teeth, their setting, the strength of the material being cut, etc.

As to band saws, it is further to be noted that they are not usually suitable for regrinding because the regrinding operation reduces the degree of tooth setting and accordingly the chip breaking effect. When the teeth are reset after regrinding this becomes very expensive. Moreover, as the major portion of the width of the saw band is not hardened to keep it flexible, the saw band cannot be reground more than once or twice as otherwise an area of the band would be reached that is not hardened and therefore unsuitable to perform a cutting action.

As to band saws having reinforced teeth, the reinforcing layer is applied only to the apices of the teeth and therefore also in this case it is not possible to regrind them several times. Neither is it possible in this case to reset the teeth after regrinding and therefore a progressive deterioration of the efficiency of the tool has to be put up with as it becomes older.

It is therefore an object of the present invention to provide a motor saw blade, particularly but not exclusively for cutting metals, of the type having unset teeth, providing a chip breaking action without using chamfers, adapted to be reground several times by grinding the tooth apices only, thus permitting to save time and cost for regrinding, and adapted to be produced for all types of saws, particularly band saws.

A further object of the present invention is to provide a motor saw blade that can be reground many times without deterioration of its efficiency and even with improved efficiency.

These and other objects and advantages, which will become apparent as the description proceeds, are achieved according to the present invention by providing, in a motor saw blade formed of a metal blade having parallel opposed sides with unset saw teeth along at least one edge of the blade, the improvement comprising finishing saw teeth having ground centripetally tapering flanks and alternating with roughing saw teeth having a thickness considerably smaller than that of the finishing saw teeth and a height slightly greater than that of the finishing saw teeth.

Some preferred embodiments of the invention will now be described by way of example and with reference to the accompanying drawings in which:

FIG. 7 is a side view of a portion of a band saw blade according to the invention;

FIG. 8 is a section taken along the line VIII—VIII of FIG. 7;

FIG. 9 is a fragmentary side view of another embodiment of a band saw blade according to the invention;

FIGS. 10 and 11 are sections, on an enlarged scale, taken along the lines X—X and XI—XI, respectively, of FIG. 9;

FIG. 12 is a fragmentary side view of a further embodiment of a band saw blade according to the invention;

FIGS. 13 and 14 are sections, on an enlarged scale, taken along the lines XIII—XIII and XIV—XIV, respectively, of FIG. 12, and FIG. 15 is a fragmentary side view of yet another embodiment of a band saw blade according to the invention.

Figure 1:
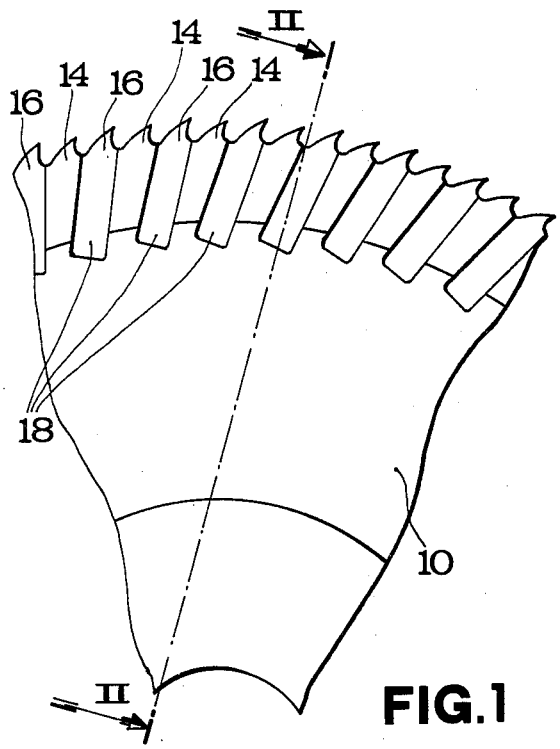
FIG. 1 is a fragmentary side view of a circular saw blade according to the invention.
Figure 2:
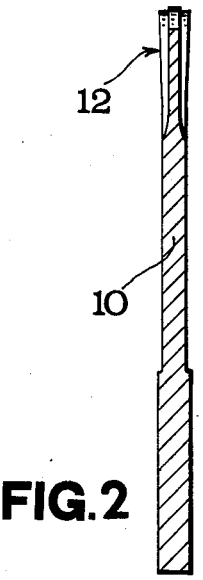
FIG. 2 is a section taken along the line II—II of FIG. 1.

In the first embodiment of a circular saw blade according to the invention, shown in FIGS. 1 and 2, the blade is formed by a disk 10 having a crown 12 of peripheral centripetal tapering teeth arranged, for example, at an angle of 1 or 2 degrees to avoid seizure of the sides of the saw blade against the walls of the cut made thereby. The outside of the crown 12 is made up of two series of alternate teeth 14 and 16, respectively, having a predetermined cutting angle to ensure the best conditions with respect to the removal of chips from the material being cut, for example, 20° for mild steel, 28° for aluminum, etc. The teeth 14 are slightly lower than the teeth 16 and serve as finishing teeth contrary to the teeth 16 which are roughing teeth. However, the difference in height between the teeth 14 and 16 is very small, for example, 2–3% of the tooth pitch, and has been made much greater in the drawings merely to show the difference.

While the opposed side surfaces of the finishing teeth 14 are ground with a taper corresponding to the configuration of the base of the crown 12, the roughing teeth 16 are made thinner by providing grooves or recesses 18 on both side surfaces of the disk 10, as shown in FIG. 2, to reduce the thickness of each roughing tooth 16 to about one third of the overall thickness of the crown 12. As shown in FIG. 1, the recesses 18 do not extend radially but are inclined relative to the radius of the saw blade so as to be about parallel to the cutting angle of the teeth.

With this configuration of the saw teeth it will be evident that the saw blade due to its complete symmetry will work the material with a perfectly balanced cutting action and simultaneously ensure an efficient chip breaking action due to the difference in height and thickness between the roughing teeth 16 and finishing teeth 14. The opposed surfaces of the cut produced by the saw have a better finish and uniformity of size than those produced by saws with set teeth.

Further, the tool shown in FIGS. 1 and 2 can be reground many times by grinding only the tooth apices, due to the provision of the grooves 18 which will always ensure a difference in thickness between the roughing teeth and the finishing teeth, this difference in thickness determining in effect the efficiency of the chip breaking action and thus the removal of the chips. The shape of the saw teeth is not substantially changed by regrinding without having to provide chip breaking chamfers after regrinding the tooth apices as was the case in the prior art circular saws having set teeth. As the chip breaking action depends exclusively on the difference in thickness and/or height between the roughing teetn and the finishing teeth and this difference is maintained for the entire life of the tool without having to reestablish it after regrinding the tooth apices (as in the case of set or chamfered saw teeth), the tool will maintain a uniform efficiency after each regrinding operation and the efficiency will even be improved with the reduction of the difference in size between the width of the front face of the finishing teeth and the thickness of the base blade because the more this difference in size is reduced the better the tool will be guided without impairing its chip breaking characteristics.

Figure 3:
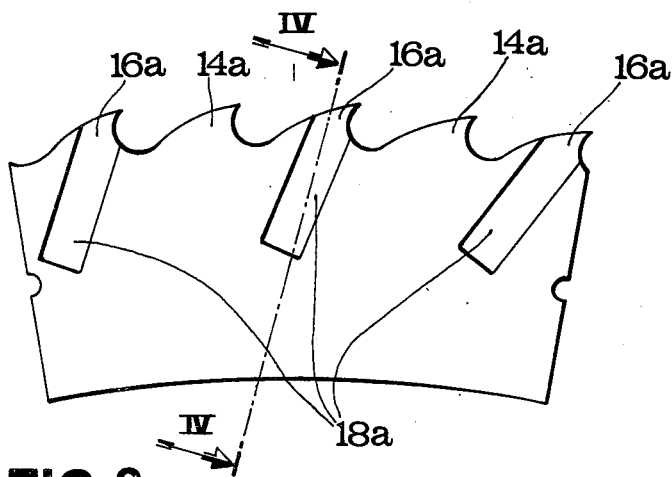
FIG. 3 is a fragmentary side view of a circular saw blade formed of detachable segments according to the invention.
Figure 4:
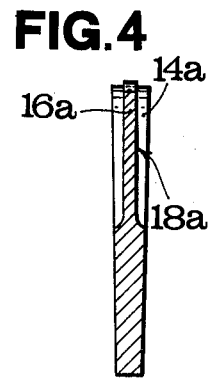
FIG. 4 is a section taken along the line IV—IV of FIG. 3.

FIGS. 3 and 4 show a segment of a circular saw blade formed of detachable segments. The saw teeth of each segment are like those shown in FIGS. 1 and 2 and thus comprise roughing teeth 16a and finishing teeth 14a. The roughing teeth 16a are higher than the finishing teeth 14a and reduced in thickness to about one third of the thickness of the segment due to the provision of inclined grooves 18a. Roughing teeth 16a alternate with finishing teeth 14a.

Figure 5:
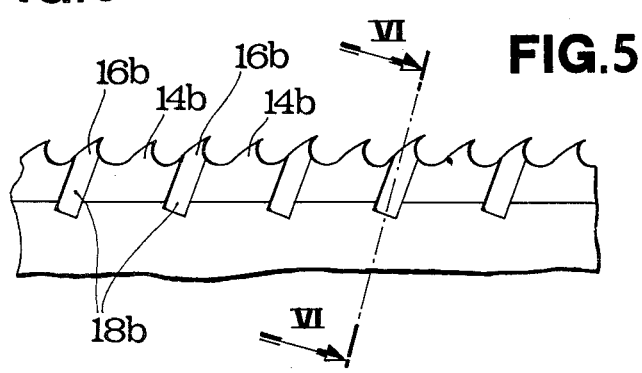
FIG. 5 is a fragmentary side view of a reciprocating saw according to the invention.
Figure 6:
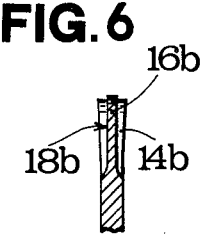
FIG. 6 is a section taken along the line VI—VI of FIG. 5.

FIGS. 5 and 6 show a portion of a reciprocating saw in which the teeth are the same as those described above and thus comprise high and thin roughing teeth 16b alternating with lower tapering finishing teeth 14b.

The operation of the tool shown in FIGS. 3 to 6 is the same as that of the tool shown in and described with reference to FIGS. 1 and 2 and therefore it is not necessary to repeat the description of the operation here. In each of the tools shown in FIGS. 1 to 6, the grooves 18 may be obtained by milling or grinding.

FIGS. 7 and 8 show a first embodiment of a band saw blade according to the invention. Also in this case the saw blade comprises a series of high and thin roughing teeth 16c alternating with a series of lower and wider finishing teeth 14c having flanks ground with a predetermined taper. In this case, too, the roughing teeth are made thinner by the provision of lateral grooves or recesses 18c extending substantially parallel to the cutting angle of the tooth and produced, for example, by milling or grinding.

To impart flexibility to the saw blade of FIGS. 7 and 8 without subjecting the saw teeth to torsional stress which would cause them to break due to fatigue, the saw blade is provided with transverse slots 20 terminating at a level below that which can be reached by the tooth base after the maximum number of regrindings. It will be understood that although in FIGS. 7 and 8 the transverse slots are provided between each two teeth, they may also be provided at each tooth or between each four or more teeth, depending upon the smallest radius of curvature at which the saw blade is to be bent.

FIGS. 9, 10 and 11 show a second embodiment of a band saw blade. In this case the band saw blade 22 is made of flexible material such as silicon steel and welded, for example electronically, to one edge of the blade are two series of teeth of a suitable metal cutting material such as superhigh-speed steel. The two series of teeth comprise a series of finishing teeth 14d having ground tapering flanks and alternating with higher and thinner roughing teeth 16d which are neither ground laterally nor tapering. To improve the flexibility of the blade, transverse slots 20 are provided between adjacent teeth 14d and 16d and terminate in notches provided in the blade 22.

With this construction it is not necessary to resort to grinding or milling operations to make the teeth thinner. Also in this case it is possible to regrind only the tooth apex up to the tooth base and possibly to take away also part of the material of the blade below the teeth. In addition to the advantages provided by the invention by the use of roughing teeth and outer finishing teeth for breaking up the chips, this embodiment also affords the advantage of clearly separating the properties required of the blade 22, on the one hand, and the teeth, on the other, which properties are flexibility and hardness, respectively.

FIGS. 12, 13 and 14 show a third embodiment of a band saw blade which is similar to the second embodiment, but the teeth have no flat base portion as they have in FIG. 9. Also in the embodiment of FIGS. 12-14 the roughing teeth 16e are welded to one edge of the blade alternately with finishing teeth 14e with the roots of the teeth welded directly to the blade. On the other hand, the slots 20 in FIG. 12 are reduced to mere notches.

FIG. 15 shows a modification of the band saw blade of FIG. 12, in which the saw teeth are set close to one another instead of being widely spaced as in FIG. 12.

Obviously the various described preferred embodiments of the invention produce tools whose prime cost is higher than that of a conventional tool for the same function. However, apart from the advantages afforded by the invention such as a higher efficiency of the tool, particularly a higher yield, less work for the same diameter of cut, and better finish of the cut surfaces, which alone would justify the higher cost, it should be considered that, taking into account the possibility of regrinding the tool several times, at least six times and in certain cases up to ten times or more, and the reduced cost of the regrinding operation, the overall cost of the tool during its entire working life may be estimated to be not higher and probably much lower than that of a conventional tool if the total number of working hours is taken into consideration. In other words, in spite of the higher working quality and the power saved by the invention, also the cost of the tool per man-hour is reduced when all other conditions remain unchanged.

Although several preferred embodiments of the invention have been described herein in detail and illustrated in the accompanying drawings, it is to be understood that numerous changes and modifications obvious to one skilled in the art may be made therein without departing from the basic inventive idea or scope of the invention as defined by the appended claims.

I claim:

1. In a motor saw blade formed of a metal blade having parallel opposed sides with unset saw teeth along at least one edge of the blade, the improvement comprising finishing saw teeth having ground centripetally tapering flanks and alternating with roughing saw teeth having a thickness considerably smaller than that of the finishing saw teeth and a height slightly greater than that of the finishing saw teeth, a recess on both sides of said roughing saw teeth providing for the smaller thickness of said roughing teeth, said smaller thickness of said roughing teeth being substantially uniform along the height of said roughing teeth.

2. A motor saw blade as claimed in claim 1, wherein the thickness of the saw blade at the roughing teeth is reduced to less than half the medium thickness of the blade.

3. A motor saw blade as claimed in claim 2, wherein the thickness of the saw blade at the roughing teeth is about one third of the thickness of the blade at its base.

4. A motor saw blade as claimed in claim 1, wherein the height of said roughing teeth is greater than the height of said finishing teeth by about 2-3%.

5. A motor saw blade as claimed in claim 1, wherein said saw blade is a circular disk saw blade.

6. A motor saw blade as claimed in claim 1, wherein said saw blade is a circular disk saw blade formed of detachable segments.

7. A motor saw blade as claimed in claim 1, wherein said saw blade is a reciprocating saw blade.

8. A motor saw blade as claimed in claim 1, wherein said saw blade is a band saw blade provided with spaced transverse slots extending over part of the width of the band saw blade to improve its flexibility.

9. A motor saw blade as claimed in claim 1, wherein said recesses are inclined at an angle substantially corresponding to the cutting angle of the saw teeth.

10. A motor saw blade as claimed in claim 1, wherein said recesses are obtained by milling away part of the original thickness of the saw blade.

11. A motor saw blade as claimed in claim 1, wherein said recesses are obtained by grinding away part of the original thickness of the saw blade.

12. A motor saw blade as claimed in claim 1, wherein said saw blade is a band saw blade made of flexible steel and said finishing saw teeth with ground tapering flanks are thicker than said band saw blade and welded to one edge thereof and said roughing saw teeth having a height greater than that of the finishing saw teeth are thinner than said band saw blade and welded to one edge thereof alternately with said finishing saw teeth.

13. A motor saw blade as claimed in claim 12, wherein said finishing saw teeth and said roughing saw teeth are made of superhigh-speed steel.

14. A motor saw blade as claimed in claim 12, wherein said roughing saw teeth are made of sheet metal.

15. A motor saw blade as claimed in claim 12, wherein said finishing saw teeth and said roughing saw teeth have a flat base portion which is in contact with the edge of said blade.

16. A motor saw blade as claimed in claim 1, wherein spaced-apart notches extend over part of the width of said blade.

17. A motor saw blade as claimed in claim 16, wherein said notches extend from one tooth to the next alternating tooth.

* * * * *